United States Patent Office 3,627,546
Patented Dec. 14, 1971

3,627,546
MARKING COMPOSITION
Leonard T. Coppeta, North Andover, Mass., assignor to
The Carter's Ink Company, Cambridge, Mass.
No Drawing. Continuation-in-part of abandoned application Ser. No. 395,570, Sept. 10, 1964. This application
Oct. 23, 1968, Ser. No. 770,111
Int. Cl. C09d 11/00, 13/00
U.S. Cl. 106—19
1 Claim

ABSTRACT OF THE DISCLOSURE

A disappearing solid marking composition, useful for crayons or the like or for transfer coatings, may be formed from an acid base indicator which is colored in the basic state, sodium metasilical nonahydrate, and a hydrophilic wax carrier. The composition is stable to atmospheric exposure, and forms a mark which disappears irreversibly.

---

This is a continuation-in-part of pending application Ser. No. 395,570, filed Sept. 10, 1964 now abandoned.

The invention herein described is a marking composition, suitable for use as a chalk, crayon, pencil or similar device, or as a transferable coating on a transfer sheet (carbon paper) or typewriter ribbon for producing a mark which will disappear upon standing exposed to normal ambient atmosphere. Disappearing markers are useful for many purposes where a marking is required only temporarily, such as to mark a cut in the manufacturing operations or to provide for re-use of instructional material, such as examination sheets and coloring books.

Disappearing marking compositions heretofore known have been in the nature of disappearing inks, typically comprising an acid-base indicator and a base such as ammonia or an alkali metal hydroxide which upon exposure to air reacts with the carbon dioxide present to acidify sufficiently for a color change to take place. Marks formed from these inks remain latent while acidic, but revert to the colored form upon exposure to or contact with a base. They are, in addition, unstable to prolonged exposure to the atmosphere, as the reaction with the carbon dioxide will take place and eventually neutralize the base.

The compositions of the invention differ in that they are solid, and stable to prolonged unprotected exposure to the atmosphere, and in that the color change to the colorless state is essentially irreversible.

The marking composition of this invention consists essentially of an acid-base type indicator which is colored in the basic state and colorless at a lower pH, in combination with a hydrated metasodium silicate, and a solid hydrophilic wax. In addition, the composition may include materials for modifying its properties such as hardening agents, strengthening agents, plasticizers, fillers and the like.

The following are typical preferred formulations:

EXAMPLE 1

| | | Parts by wt. |
|---|---|---|
| Carrier | Carbowax 1000[1] | 34 |
| | Carbowax 6000[2] | 54 |
| Plasticizer | Glycerine | 4 |
| Indicator | Thymolphthalein | 4 |
| Alkali | Sodium metasilicate nonahydrate Na$_2$SiO$_3$.9H$_2$O | 4 |

[1] A polyethylene glycol having a MW of about 1,000.
[2] A polyethylene glycol having a MW of about 6,000.

The ingredients are combined by first melting the Carbowax, then adding the glycerine and thymolphthalein and stirring until the latter dissolves. The sodium metasilicate is then added with stirring continued until a deep blue color develops. The melt is then cast into the appropriate shape, e.g. a crayon, and cooled, or applied as a hot melt coating to a backing to form a transfer sheet or ribbon.

The product produces a blue mark which disappears in from ½ to 4 hours, depending on the thickness of the mark, and on atmospheric conditions.

EXAMPLE 2

| | | Parts by wt. |
|---|---|---|
| Carrier | Carbowax 20M[3] | 68 |
| | Cgrbowax 1500[4] | 15.5 |
| Indicator | Thymolphthalein | 2 |
| Alkali | Sodium metasilicate nonahydrate | 13 |
| Filler | Alumina | 1.5 |

[3] A polyethylene glycol having a MW of about 15-20,000.
[4] A polyethylene glycol having a MW of about 1,500.

The ingredients are mixed in the same manner as in Example 1, adding each in the order listed above, and the molten mixture is then cast, injection molded or extruded to the desired form and allowed to harden.

The foregoing examples are representative of the compositions of this invention and provide very satisfactory products. The various components and the amounts of them may, however, be varied within limits provided that certain characteristics are maintained.

The carrier material should be a compatible waxy or unctuous solid which is hydrophilic, preferably somewhat water soluble, to the point that it will retain sufficient moisture under normal conditions of storage and transportation that a color forming reaction between the indicator and the alkali will occur. In the example, the mixture of a high molecular weight Carbowax and a low molecular weight Carbowax is employed, the former giving proper body and wax-like characteristics and the latter modifying the former and introducing a component of greater water solubility and hygroscopicity. Other water soluble waxy or unctuous materials which are compatible with the other ingredients may be employed as the carrier, such as glycol and glycerol mono-esters of fatty acids, e.g., ethylene glycol derivatives such as methoxy polyethylene glycol.

Plasticizers such as glycerine, propylene glycol, low molecular weight Carbowax, diphenylphthalate, dipropylene glycol, liquid polyols or Santicizer 1H (N-cyclohexyl p-toluene sulfonamide) may also be employed, either to introduce a hygroscopic component or to modify the physical nature of the marking material.

Where a harder composition than provided by the carrier compound alone is desired, fillers may be added such as alumina or bentonite, and where greater physical strength is needed, strengthening agents may be added, such as compatible waxes, e.g. paraffin, shellac, polyvinyl pyrrolidone or Santolite MHP (a formaldehyde-aryl sulfonamide resin). These materials in general decrease the hygroscopicity of the formulation and prolong the length of time which the mark will endure. In physical nature, the carrier, in combination with an additive present, should be waxy or wax-like and hard enough to produce a mark by ordinary writing pressure or impact. The carrier is accordingly herein described generally as a solid hydrophilic wax.

Numerous indicators which are colored in the alkaline state and colorless at a lower pH may be employed. The foregoing examples employ thymolphthalein which changes from blue to colorless at about pH 9.3. Phenolphthalein, which turns from red to colorless at pH 8.0, or meta nitrophenol, which turns from yellow to colorless at pH 6.8 may also be used, as may others known to the art.

The colored basic state is maintained in the composition by the presence of sodium metasilical nonahydrate. This incorporates not only a basic compound, but also the water necessary for color formation as water of crystallization. As such the water is bound up stably in the metasilicate crystal, and does not tend to evaporate away. The composition is consequently stable when exposed to the atmosphere.

The disappearance of the color is brought about by gradual neutralization of the alkaline agent by the carbon dioxide in the air, which causes the indicator to revert to its colorless low pH form. In this connection, it is preferable to make use of indicators that change color somewhat on the alkaline side of neutrality, so that attainment of a sufficiently low pH to bring about the colorless form is more certainly assured. References herein to the indicator being colored in the basic state pertain to the presence of color at a pH higher than the pH at which the indicator is colorless, and do not imply that color exists at all pH values greater than 7.

The composition itself will, of course, react with atmospheric carbon dioxide, and its surface portions also become colorless. However, a protective shield is thereby built up which prevents complete discoloration. Under writing action the colorless surface portions are rubbed off exposing colored material to the surface being marked upon.

A particularly useful characteristic of the composition of this invention is that after a mark formed from it has disappeared subsequent contact with a base does not cause it to reappear. The reason for this is not known but is believed to lie in the combination of physical and chemical changes that take place after a mark has been made. Just as the composition itself forms a protective layer that prevents complete discoloration upon prolonged exposure to the atmosphere, this same protective attribute may well prevent subsequent color reversal upon contact with a base.

From the foregoing description, it should be evident that this invention provides a novel composition and also a new and useful marking device of a type not heretofore known.

Having thus disclosed my invention and described in detail preferred embodiments thereof, I claim and desire to secure by Letters Patent:

1. A marking device characterized by being producive of a mark which will disappear on standing, comprising as the effective marking agent a solid composition which includes a hydrophilic wax, and acid base indicator which is colored in the basic state and colorless at a lower pH, and sodium metasilicate nonahydrate in an amount sufficient to maintain said indicator in the colored basic state prior to marking.

References Cited
UNITED STATES PATENTS

| | | | |
|---|---|---|---|
| 2,474,084 | 6/1949 | Adams | 106—21 X |
| 2,589,306 | 3/1952 | Steiner | 106—22 |
| 2,699,432 | 1/1955 | Marra et al. | 106—84 X |
| 2,980,551 | 4/1961 | Thomsen | 117—36.8 |
| 3,076,406 | 2/1963 | Florence | 117—36.8 X |
| 3,158,506 | 11/1964 | Ellison | 117—36.8 X |
| 3,311,479 | 3/1967 | Alburger | 106—23 X |

JOAN B. EVANS, Primary Examiner

U.S. Cl. X.R.

106—31, 272